United States Patent
Fernsler et al.

Patent Number: 5,491,389
Date of Patent: Feb. 13, 1996

[54] RASTER EDGE CORRECTION WAVEFORM

[75] Inventors: Ronald E. Fernsler; Kevin M. Williams, both of Indianapolis, Ind.

[73] Assignee: Thomson Consumer Electronics, Inc., Indianapolis, Ind.

[21] Appl. No.: 241,021

[22] Filed: May 11, 1994

[51] Int. Cl.⁶ .................................................. H01J 29/56
[52] U.S. Cl. ........................................................ 315/371
[58] Field of Search .............................. 315/371; 348/746

[56] References Cited

U.S. PATENT DOCUMENTS

| | | | |
|---|---|---|---|
| 4,733,140 | 3/1988 | Oliver | 315/371 |
| 4,777,412 | 10/1988 | Leonardi | 315/371 |
| 4,968,919 | 11/1990 | Oliver | 315/371 |
| 5,034,664 | 7/1991 | Fernsler et al. | |

FOREIGN PATENT DOCUMENTS 2640785  3/1978  Germany.

OTHER PUBLICATIONS

U.S. Application Sn. 08/099,377, Deflection Waveform Correction Circuit, FIGS. 1 & 4.

Copy Euronean search report dated Sep. 15 1995, two pages plus cover page.

Primary Examiner—Theodore M. Blum
Attorney, Agent, or Firm—Joseph S. Tripoli; Joseph J. Laks; Francis A. Davenport

[57] ABSTRACT

A video display having deflection correction comprising a cathode ray tube with a deflection coil mounted on the cathode ray tube for generation of a raster having horizontal line length variations which describe a generally sinusoidally shaped raster edge. A deflection amplifier is coupled to the deflection coil for generating a deflection current therein. A modulator is coupled to the deflection coil for generating a corrective current therein responsive to a corrective signal. A corrective signal generator for generating said corrective signal having a generally sinusoidal shape is coupled to the modulator for raster edge correction.

13 Claims, 3 Drawing Sheets

RASTER EDGE CORRECTION WAVEFORM

This invention relates to the field of video display, and in particular to the generation of deflection waveform correction signals for a cathode ray tube display.

BACKGROUND OF THE INVENTION

Manufacturing cost and production cost considerations may dictate that a direct view television receiver design be utilized to form the basis of a projection display receiver. Such a projection display receiver design is predicated upon minimum changes to the basic receiver design such that manufacturing, test and alignment procedures are essentially unchanged.

In a projection type video display, the raster distortions associated with a direct view display may be exacerbated by the use of a curved face plate CRT and the magnification inherent in the optical projection path.

The combination of direct view deflection waveform correction, and the requirement to achieve more stringent convergence specifications associated with a projected raster require the use of additional deflection correction waveforms.

SUMMARY OF THE INVENTION

A video display having deflection correction comprising a cathode ray tube with a deflection coil mounted thereon for generation of a raster having horizontal line length variations which describe a generally sinusoidally shaped raster edge. A deflection amplifier is coupled to the deflection coil for generating a deflection current therein. A modulator is coupled to the deflection coil for generating a corrective current therein responsive to a corrective signal. A corrective signal generator for generating said corrective signal having a generally sinusoidal shape is coupled to the modulator for raster edge correction.

DETAILED DESCRIPTION

Figure 1:
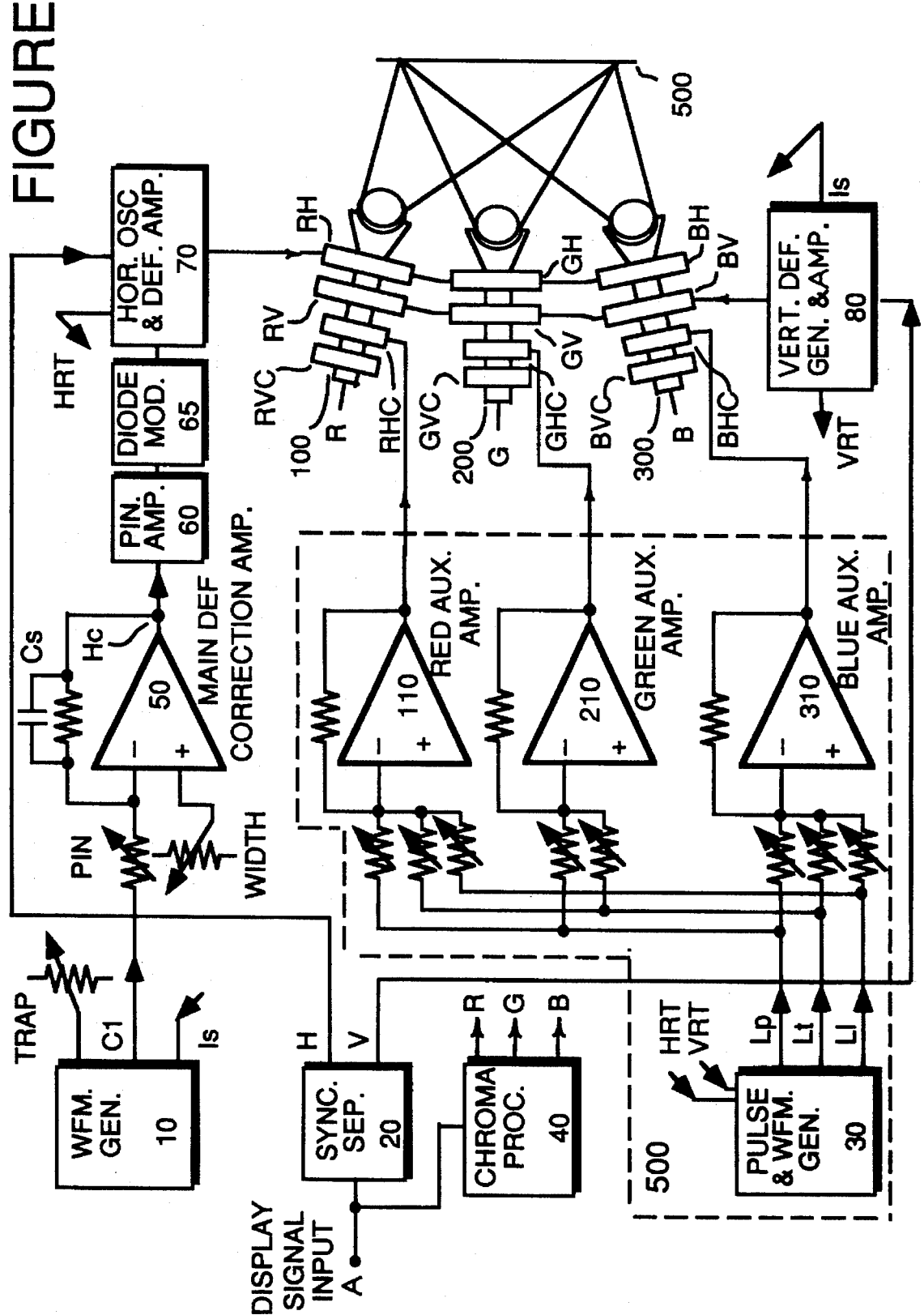
FIG. 1 is a simplified block diagram of a CRT projection video display including inventive features.

A cathode ray tube projection type video display is depicted in FIG. 1. Three cathode ray tubes are mechanically arranged, and optically coupled, to project images from CRT phosphor display surfaces on to a screen. A video signal is input at terminal A and is coupled to a chrominance separation circuit which extracts coloring signals, for example, red, green, and blue for coupling to an appropriate CRT for display. The input signal is also coupled to a sync separator which separates horizontal and vertical synchronizing pulses for coupling to synchronize a horizontal oscillator and deflection generator and a vertical oscillator and deflection generator. The vertical deflection amplifier is coupled to the vertical deflection coils which are series connected. The horizontal deflection generator is coupled to horizontal deflection coils which are connected in parallel. Horizontal deflection waveform correction signals are coupled to a diode modulator which provides correction in all three rasters.

Figure 2:
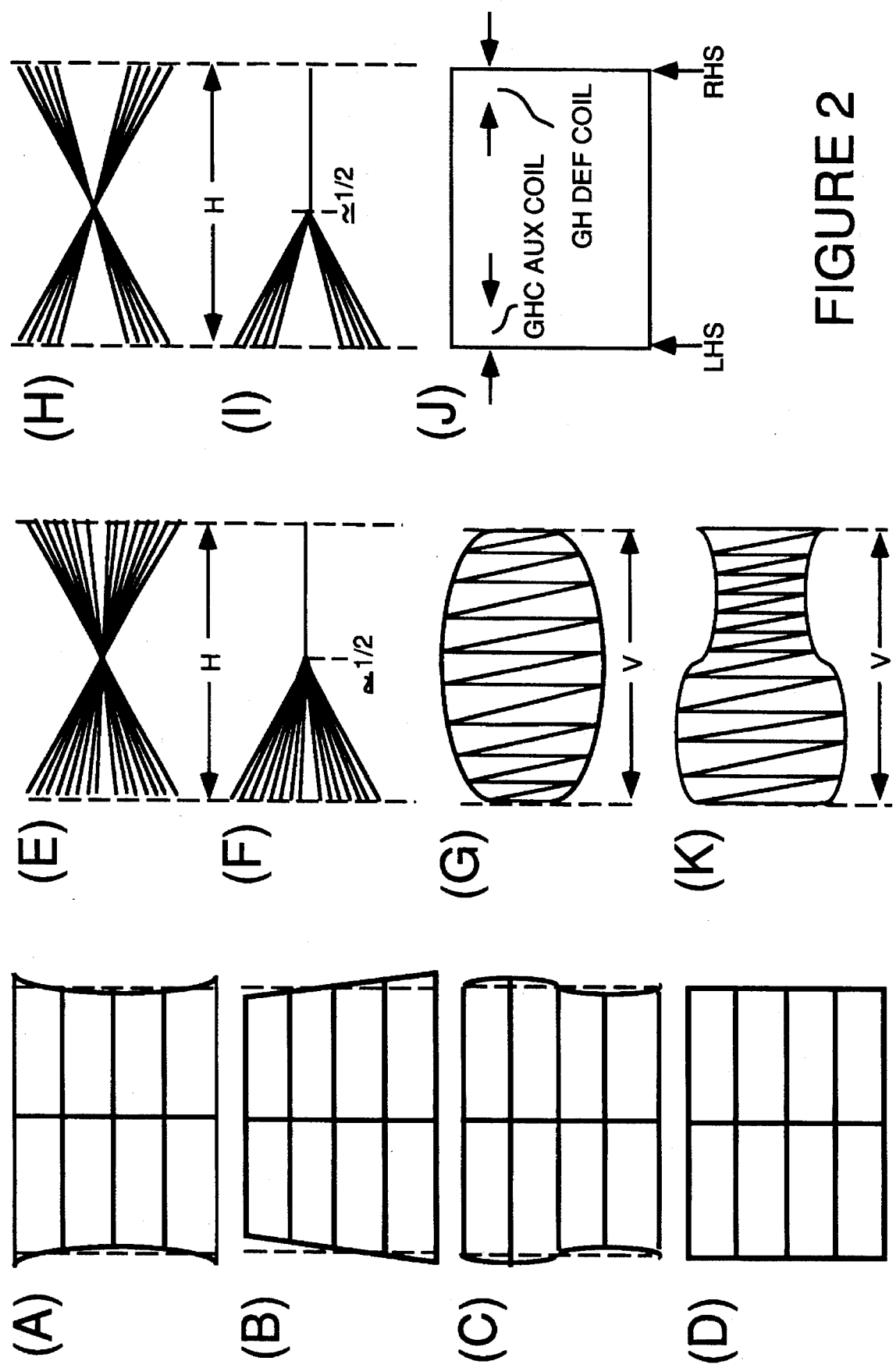
FIG. 2 shows rasters depicting various distortions, and various corrective signal waveforms.

The additional geometrical correction required for projection display is provided by auxiliary deflection coils which provide both horizontal and vertical deflection correction in each CRT. The horizontal auxiliary deflection coils are driven by individual amplifiers each having multiple controls for adjustment of correction signal amplitude. Certain correction waveforms are generated to provide correction only in the area of a specific raster edge, and these have a duration of less than a trace period. The main horizontal deflection generator produces horizontal deflection and in addition provides master horizontal waveform correction, for example, pincushion and trapezium correction in all three rasters. However, the master pincushion and trapezium controls, although active over the whole horizontal raster, are adjusted to specifically correct one raster edge, for example the right hand side. FIG. 2 (J) is an exemplary depiction of the green raster or display image, and indicates that the master trapezium and pincushion corrections are applied by the horizontal deflection coil and are optimized at the right hand side RHS. The left hand side LHS, of the raster or display is adjusted in each individual CRT by corrective currents generated in the horizontal auxiliary deflection coils. These auxiliary deflection currents provide for example, linearity, pincushion and trapezium correction which is operable over a limited raster area. Hence, horizontal raster correction is achieved by a combination of corrective currents applied in both the main and auxiliary deflection coils.

A video display signal is coupled to terminal A which feeds a chrominance processor 40 and a synchronizing pulse separator 20. Chrominance processor 40 extracts coloring signals form the display signal, for example red R, green G, and blue B, which are coupled to the CRT of the appropriate color. The synchronizing pulse separator 20, extracts from the input display signal, horizontal and vertical synchronizing pulses. The separated horizontal sync pulses H, are coupled to the horizontal oscillator and deflection amplifier 70, for synchronization. The vertical sync pulses are coupled to synchronize the vertical deflection generator 80. The vertical deflection generator includes a deflection amplifier which is coupled to vertical deflection coils of each CRT, which are connected in series. A deflection current sample Is, a vertical rate sawtooth signal, is coupled from the deflection amplifier 80, to a waveform generator 10. A vertical retrace pulse VRT, generated by deflection amplifier 80 is coupled to pulse and waveform generator 30. Waveform generator 10 processes the vertical sawtooth waveform Is, to generate a parabolic shaped signal for pincushion correction. The vertical sawtooth waveform Is, is also coupled via a control TRAP, to provide a trapezium correction component in the pincushion correction signal. The output signal from waveform generator 10, comprises a parabolic signal C1, having a vertical rate sawtooth component which is coupled via an amplitude control PIN. The composite pincushion and trapezium correction signal is coupled to an inventive summing and waveform shaping amplifier 50, which combines the composite pincushion and trapezium correction signal C1, with a width determining DC component. The summing and waveform shaping amplifier 50, advantageously employs frequency sensitive feedback via capacitor Cs, which is chosen to generate a further correction component which is added to the composite correction waveform. FIG. 2 (C) shows a raster corrected for both pincushion and trapezium distortion but displaying a vertical rate S or sinusoidal shaped horizontal line length error. FIG. 2 (D) shows a corrected raster including the corrective effect advantageously produced by processing the parabolic pincushion correction signal in amplifier 50.

The shaped correction and width determining signal Hc, at the output of amplifier 50, is coupled to a pincushion power amplifier 60, comprising a pair of transistors, Q1 and Q2, connected in a Darlington configuration. Power amplifier 60, is coupled to a diode modulator 65, which operates in a well known manner. Diode modulator 65, is coupled, as is well known, to an output of deflection amplifier 70, and generates a corrective current I1cor. The corrective current provides pincushion, trapezium and S shaped correction of the horizontal deflection signal together with control of deflection width in all three display tubes. Deflection amplifier 70, also comprises a horizontal oscillator which is synchronized by separated horizontal sync pulses H, generated from the video display signal by separator 20. A horizontal retrace pulse HRT, is generated by a winding of a horizontal output transformer, which is not shown, and coupled to waveform generators 10 and 30.

FIG. 1 shows three cathode ray tubes 100, 200, 300, mechanically arranged to project individual colored rasters to form a single raster on a screen 500. Each CRT displays an essentially monochromatic color raster appropriate to the color signal coupled thereto. The center CRT 200, for example, displaying a green raster, may be positioned such that the raster center is orthogonal to the screen 500. The two other tubes are symmetrically displaced from the center tube position and consequently no part of their raster is projected orthoganally onto the screen. Thus, in the highly simplified arrangement of FIG. 1, the outer displayed rasters will suffer a trapezoidal geometrical distortion in addition to other geometrical distortions resulting from electron beam scanning. The cathode ray tubes shown in FIG. 1 have a curved, concave spherical phosphor display surface. Curved face plate cathode ray tubes are manufactured, for example, by MATSUSHITA, as type P16LET07(RJA) red channel, P16LET07(HKA) green channel, P16LET07(BMB) blue channel. The image formed on the concave spherical phosphor surface may be considered similar to an image projected onto the surface of a sphere. The complexity of geometrical correction may be appreciated if the consequences resulting from a shift adjustment is considered. Such horizontal, or vertical, movement will cause the image corners to move at a different rate to that of the edge centers, i.e. a shift adjustment may result in a combination of pincushion and trapezium distortion of the display. Thus, since the projected image is composed of three rasters in register on the screen, a combination of corrective deflection waveforms is required to compensate for the combined display distortions resulting from electron beam deflection, tube face plate shape and optical display path.

In FIG. 1 each cathode ray tube is depicted with four coils, for example, the red CRT 100 shows a horizontal deflection coil RH, a vertical deflection coil RV and auxiliary deflection coils RVC and RHC. The auxiliary deflection coils provide vertical and horizontal deflection correction respectively. The green and blue display tube coil sets are the same as those of the red CRT. The functions depicted within element 500 of FIG. 1, may be considered to provide horizontal deflection correction additional to that produced by the main horizontal deflection circuitry.

The vertical auxiliary deflection coils are driven with suitable corrective signals which are not shown. Each horizontal auxiliary deflection coil is driven by an auxiliary deflection amplifier, for example, the red auxiliary coil RHC is coupled to amplifier 110, and similarly amplifier 210 is coupled to the green auxiliary coil GHC, and amplifier 310 is coupled to the blue auxiliary coil BHC. The red, green and blue auxiliary horizontal deflection amplifiers generate corrective currents I2corR, I2corG and I2corB in horizontal auxiliary deflection coils RHC, GHC and BHC respectively.

The red and blue auxiliary horizontal deflection amplifiers, 110 and 310, are illustrated in simplified form showing only three separately controlled correction signal inputs, namely left linearity Ll, left pincushion Lp, and left trapezium Lt. In reality the red and blue auxiliary deflection amplifiers each have approximately eight different corrective signals which are controllably summed by the amplifiers. The green auxiliary deflection amplifier 210, is shown with two corrective signal inputs, left pincushion Lp and left trapezium Lt. The green amplifier has fewer corrective input signals than red and blue since the green CRT raster or image is used as the reference to which the red and blue rasters or projected images are matched or converged.

Various forms of raster distortion are illustrated in FIG. 2. Horizontal pincushion or East West distortion is shown in FIG. 2 (A). FIG. 2 (B) illustrates trapezium or keystone geometrical distortion. In FIG. 2 (C) the horizontal line lengths are shown to vary at vertical rate in the form of an S or vertical rate sine function. A corrected display raster is shown in FIG. 2 (D).

The correction signals left linearity Ll, left pincushion Lp and left trapezium Lt are generated by a pulse and waveform generator 30. FIG. 2 (E) depicts one horizontal interval of a horizontal deflection trapezium correction signal. The generation of such a signal is well known, for example the signal may be produced by multiplication or modulation of a horizontal rate sawtooth by a vertical rate sawtooth. The correction of one raster edge, for example the left edge, may be achieved by generating a signal as depicted in FIG. 2 (F), where the modulated signal is present for only part of a horizontal period. In FIG. 2 (F) a left horizontal deflection trapezium correction signal is shown, however, the waveform may be generated or truncated to provide correction at either edge. Furthermore there is no requirement that the waveform start or stop at exactly the center of horizontal trace time as depicted. Methods for generating such left or right corrective waveforms are well known, for example U.S. Pat. No. 4,935,674 teaches the generation of various truncated waveforms.

A pincushion corrective signal is depicted in FIG. 2 (G, H, I) where FIG. 2 (G) shows a modulated parabolic shape when observed at a vertical rate. FIG. 2 (H) depicts the same corrective signal but observed at a horizontal rate, showing amplitude modulation of horizontal rate ramps. In FIG. 2 (I) the amplitude modulated horizontal rate ramps are generated during a first part of a horizontal interval.

Figure 3:
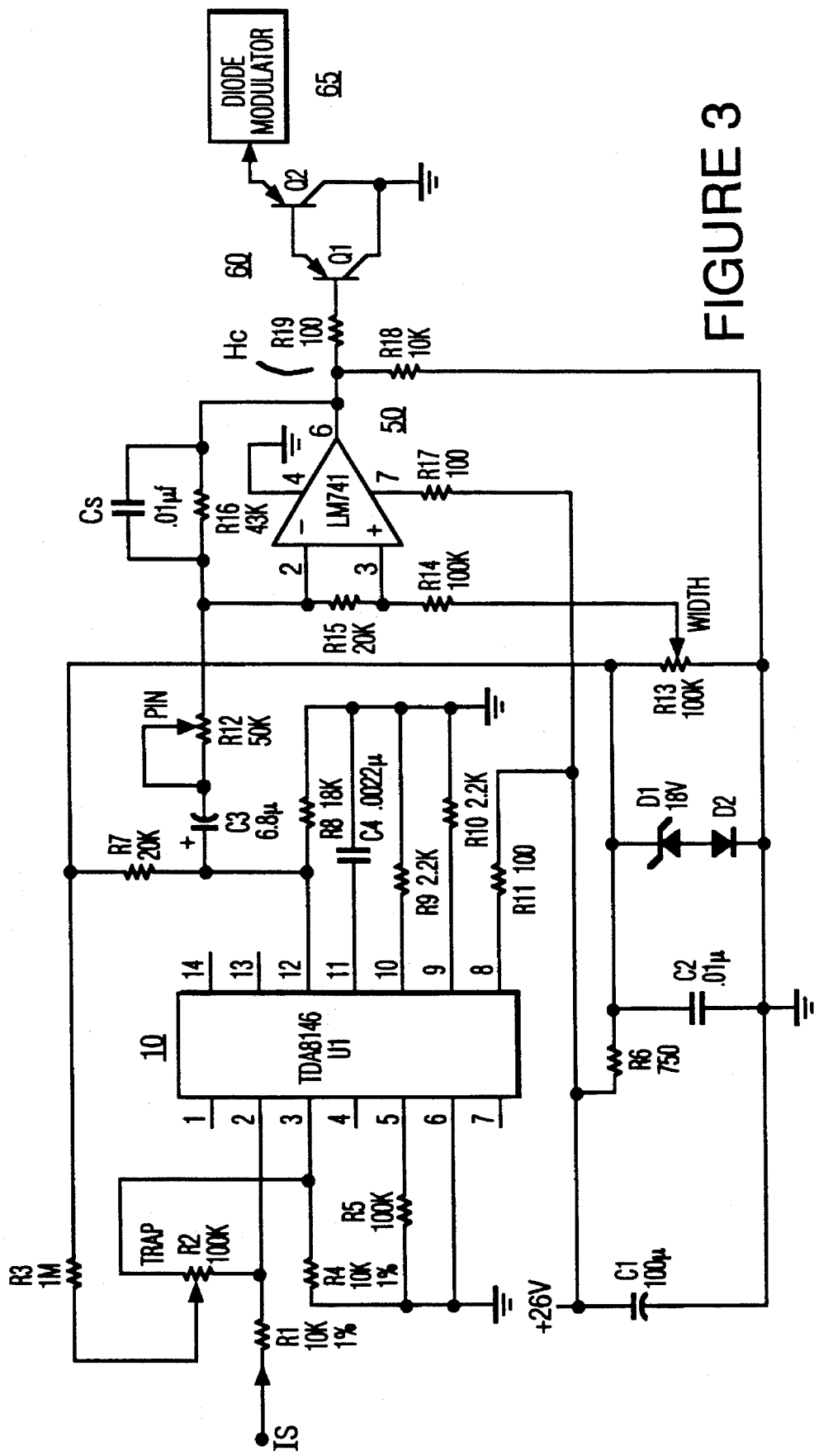
FIG. 3 illustrates inventive circuitry contained in FIG. 1.

FIG. 3 is an electronic schematic drawing showing the main horizontal deflection correction circuitry which includes waveform generator 10, an inventive summing amplifier 50, pincushion amplifier 60 and diode modulator 65.

A 26 volt supply is decoupled by a capacitor C1 and applied via a resistor R6 to a cathode of a zener diode D1 and diode D2 which are connected in series to ground. Diode D2 is forward biased by the zener current of diode D1 to provide temperature compensation. Diode D1 has an 18 volt break down potential, and is decoupled to ground by a capacitor C2.

The vertical deflection current sample Is, a sawtooth shaped signal, is applied via an input resistor R1 to an inverting input of a function generating integrated circuit U1, for example type TDA8146. Integrated circuit U1, also contains pulse width modulating circuitry which if required, may be used to generate a switching drive signal for the modulator. The 26 volt supply is coupled to U1 pin 8, via a resistor R11. An internal voltage reference and starting circuit is biased by a resistor R5, connected from U1 pin 5 to ground. An unused horizontal retrace pulse input at U1 pin 10 is connected to ground by a resistor R9. An unused internal zener clipping diode, at U1 pin 9, is connected to ground by a resistor R10. A capacitor C4 is connected between U1 pin 11 and ground and is required for generation of a horizontal rate sawtooth shaped signal in conjunction with the internal pulse width modulator.

The function generating circuitry within integrated circuit U1 includes an amplifier with a non-linear characteristic which generates a parabolic shaped signal from the sawtooth shaped input signal Is. Resistor R1 is also connected to one end of a potentiometer R2 TRAP, the other end of which is connected to a non-inverting input of IC U1. The wiper of the potentiometer R2 is coupled via a resistor R3 to the 18 volt DC potential generated by a zener diode D1. Varying the wiper position of potentiometer R2 introduces a differential bias current into the amplifier inputs which results in the output parabolic shaped signal being tilted or effectively superimposed on a vertical rate sawtooth shaped ramp. Thus potentiometer R2 TRAP, provides control of trapezoidal shaped correction. The non-inverting input of IC U1 is also connected to ground via a resistor R4.

The parabola generator output at pin 12 of U1, is connected to a potential divider formed by resistors R7 and R8. Resistor R7 is connected the 18 volt supply, and resistor R8 is connected to ground. The potential divider sets the output terminal to approximately 8.5 volts DC. The parabolic correction signal output is AC coupled by a capacitor C3 which couples the signal to a variable resistor R12 PIN, which provides control of the correction signal amplitude. Variable resistor R12 is connected to an inverting input of an integrated circuit amplifier 50, for example type LM 741.

Integrated circuit amplifier 50 is connected as a summing amplifier with inventive frequency sensitive negative feedback coupled from the output terminal to the inverting input. The frequency sensitive feedback results from a parallel combination of a resistor R16 and a capacitor Cs. Summing amplifier 50 has a low frequency gain determined by the setting of resistor R12 PIN. The AC gain is determined largely by feedback capacitor Cs, which is selected to reduce the AC gain above approximately 60 Hz, reaching a reduction of approximately 26 dB above 10 KHz. The raster distortion depicted in FIG. 2 (C) shows at vertical rate, a nominally sinusoidal horizontal line length error, where the length errors are zero at the raster top, center and bottom. Hence, to provide raster edge straightening, a nominally sinusoidal correction signal is required with the signal producing zero correction at the raster top, center and bottom. FIG. 2 (K) depicts at vertical rate, a nominally sinusoidal amplitude modulation of horizontal deflection current which provides the required edge straightening of the distortion shown in FIG. 2 (C).

The result of frequency response shaping by feedback capacitor Cs may be considered intuitively. The nominally parabolic correction signal input to summing amplifier 50, may be considered to be comprised of a fundamental component, at vertical frequency, plus multiple harmonic frequency components. Thus, since the desired correction signal is nominally sinusoidal at the vertical frequency, enhancement of the amplitude of the fundamental parabolic signal component will produce the desired correction. The parabolic signal fundamental component amplitude may be effectively increased by reducing the amplitude of the second and higher order harmonic frequency components. The frequency selective feedback distorts the nominally parabolic shape of the correction signal Hc to produce the required sinusoidal corrective component which is effectively superimposed upon the parabolic signal. However, the basic waveform shape remains essentially parabolic and is only nominally delayed by the frequency selective feedback. Hence the sinusoidal component is generally correctly positioned or phased, to achieve the require correction, having essentially zero corrective effect at the raster top, center and bottom. The attenuation of the higher order harmonic components results in a minor change to the parabolic cusp shape which does not greatly impair the overall corrective effect of the composite correction signal.

The inverting input is coupled to the non-inverting input via a resistor R15. The non-inverting input is also coupled, via a resistor R14, to the wiper of potentiometer R13 WIDTH, which is coupled between the 18 volt supply and ground. Potentiometer R13 provides an adjustable width determining DC potential to the non-inverting input of summing amplifier 50. The output from amplifier 50 is an analog signal comprising the summation of the DC width potential, the vertical rate tilted parabolic signal and a vertical rate sinusoidal component due to capacitor Cs. Amplifier 50 is connected to the 26 volt DC supply by a resistor R17. The output terminal of amplifier 50 is connected to the junction of resistors R18 and R19, where resistor R18 is connected to ground. Resistor R19 couples the summed correction signal to a Darlington connected amplifier 60, comprising PNP transistors Q1 and Q2. The emitter of transistor Q1 is directly connected to the base of transistor Q2 and the collectors of both transistors are connected to ground. The emitter terminal of transistor Q2 is connected to diode modulator 60 which generates corrective current I1cor, which provides both static and dynamic control of horizontal deflection amplitude.

The development of a projection video display based upon a direct view chassis design has resulted in the application of deflection corrective signals to both the main and auxiliary deflection coils, and in addition has resulted the development of an edge straightening corrective signal.

What is claimed is:

1. A video display having deflection correction comprising:

a cathode ray tube;

a deflection coil mounted on said cathode ray tube;

a deflection amplifier coupled to said deflection coil to generate a deflection current therein that produces a raster having horizontal line length variations which describe a generally sinusoidally shaped raster edge;

a diode modulator coupled to said deflection coil for generating a corrective current therein responsive to a composite corrective signal; and, a corrective signal generator generating a parabolic shaped signal coupled to an amplifier having frequency selective feedback for generating said composite corrective signal having a generally parabolic shape which includes a sinusoidal shape, said composite corrective signal being coupled to said modulator for raster correction.

2. The video display of claim 1, wherein said frequency selective negative feedback circuit comprises a parallel connected resistor and capacitor.

3. The video display of claim 1, wherein said modulator generates side pincushion corrective current.

4. The video display of claim 1, wherein said generally sinusoidally shaped raster edge has essentially zero error at a raster top, a raster center and a raster bottom.

5. The video display of claim 1, wherein said raster further includes horizontal line length variations which describe generally parabolic shaped raster edges.

6. The video display of claim 5, wherein said corrective signal includes a parabolic shaped signal for raster edge correction.

7. The video display of claim 1, wherein said parabolic shape and said sinusoidal shape are generated substantially in coincidence.

8. A deflection waveform correction apparatus comprising:
   a source of a generally parabolic shaped correction signal;
   a side pincushion modulator for deflection current modulation responsive to a modulating signal coupled thereto; and
   an amplifier coupled to said source having a transfer characteristic which modifies said generally parabolic shaped correction signal to form said modulating signal, said modulating signal comprising said generally parabolic shaped correction signal and a generally sinusoidal signal component.

9. The deflection waveform correction apparatus of claim 8, wherein said generally sinusoidal signal produces deflection current modulation for straightening S shaped raster edges.

10. The deflection waveform correction apparatus of claim 8, wherein said generally sinusoidal signal is generated approximately concurrently with said parabolic shaped correction signal.

11. A video projection display having distortion correction of a projected raster comprising:
    a plurality of cathode ray tubes;
    a plurality of deflection coils, each mounted on ones of said plurality of cathode ray tubes;
    a deflection amplifier coupled to said plurality of deflection coils to generate deflection current therein that produces a projected raster having horizontal line length variations which describe a generally sinusoidally shaped raster edge;
    a waveform modulator responsive to a composite corrective signal and coupled to said amplifier for generating a corrective current; and
    a composite corrective signal generator generating a parabolic shaped signal, modified to include a sinusoidal shaped component, coupled to said modulator for raster correction.

12. The video projection display of claim 11, wherein said parabolic signal being modified by a means for frequency response shaping.

13. The video projection display of claim 11, wherein said parabolic shaped signal and said sinusoidal shaped component are substantially concurrent.

* * * * *